(12) United States Patent
Kim et al.

(10) Patent No.: US 7,611,153 B2
(45) Date of Patent: Nov. 3, 2009

(54) ELECTRONIC CONTROLLED SUSPENSION APPARATUS AND VEHICLE HEIGHT CONTROL METHOD THEREOF

(75) Inventors: Jong Hun Kim, Seoul (KR); Wan Il Kim, Gyeonggi-do (KR)

(73) Assignee: Mando Corporation, Seoul (KR)

( * ) Notice: Subject to any disclaimer, the term of this patent is extended or adjusted under 35 U.S.C. 154(b) by 261 days.

(21) Appl. No.: 11/716,389

(22) Filed: Mar. 9, 2007

(65) Prior Publication Data

US 2008/0023927 A1  Jan. 31, 2008

(30) Foreign Application Priority Data

Jul. 25, 2006  (KR) ............... 10-2006-0069640

(51) Int. Cl.
*B60G 17/015* (2006.01)
(52) U.S. Cl. .............. 280/5.514; 280/5.508; 280/6.157; 701/37
(58) Field of Classification Search .............. 280/5.508, 280/5.514, 6.157, 6.158; 701/37
See application file for complete search history.

(56) References Cited

U.S. PATENT DOCUMENTS

| | | | | |
|---|---|---|---|---|
| 4,787,644 A | * | 11/1988 | Yokote et al. ............ | 280/6.157 |
| 4,803,630 A | * | 2/1989 | Takizawa et al. ............. | 701/39 |
| 4,830,394 A | * | 5/1989 | Tanaka et al. ............ | 280/5.512 |
| 4,856,815 A | | 8/1989 | Tanaka et al. ............... | 280/707 |
| 4,937,748 A | * | 6/1990 | Yonekawa et al. ............ | 701/38 |
| 4,965,878 A | * | 10/1990 | Yamagiwa et al. ............ | 701/37 |
| 5,058,017 A | * | 10/1991 | Adachi et al. ................. | 701/38 |
| 5,067,743 A | * | 11/1991 | Kokubo et al. ............ | 280/5.507 |
| 5,165,715 A | * | 11/1992 | Sakamoto et al. ......... | 280/5.502 |
| 5,180,024 A | * | 1/1993 | Eto .............................. | 180/41 |
| 5,364,122 A | * | 11/1994 | Ichimaru .................. | 280/6.157 |
| 5,430,647 A | * | 7/1995 | Raad et al. ..................... | 701/38 |
| 5,530,648 A | * | 6/1996 | Lavey .......................... | 701/37 |
| 5,711,150 A | | 1/1998 | Oshita et al. .................. | 60/407 |
| 6,116,618 A | * | 9/2000 | Shono et al. ............. | 280/5.501 |

(Continued)

FOREIGN PATENT DOCUMENTS

EP  0306819 A2  3/1989

(Continued)

*Primary Examiner*—Paul N Dickson
*Assistant Examiner*—Laura Freedman
(74) *Attorney, Agent, or Firm*—Seed IP Law Group PLLC

(57) ABSTRACT

The present invention relates to an electronic controlled suspension apparatus capable of stopping vehicle height control when a vehicle turns and performing the vehicle height control when the vehicle goes straight ahead by using vehicle height sensors instead of a steering angle sensor, and a vehicle height control method of the electronic controlled suspension apparatus. To this end, there is provided an electronic controlled suspension apparatus, including a plurality of vehicle height sensors for measuring a height of a vehicle; a vehicle height adjusting actuator operable to adjust the height of the vehicle; air springs controlled by the vehicle height adjusting actuator; and an electronic controlled unit (ECU) for calculating a height difference value between the left and right sides of the vehicle based on vehicle height signals received from the vehicle height sensors and determining whether to operate or stop the vehicle height adjusting actuator through the comparison of the calculated height difference value between the left and right sides of the vehicle with a predetermined reference value.

8 Claims, 3 Drawing Sheets

U.S. PATENT DOCUMENTS 6,688,612 B1 * 2/2004 Burdock et al. .......... 280/5.502
2005/0113997 A1 * 5/2005 Kim ............................ 701/37

FOREIGN PATENT DOCUMENTS

| EP | 0386623 A2 | 9/1990 |
| EP | 1518721 A1 | 3/2005 |
| JP | 61-247506 | 11/1986 |
| JP | 63-275416 | 11/1988 |
| JP | 02-057415 | 2/1990 |
| JP | 2003-089311 | 3/2003 |
| JP | 2004352091 A | 12/2004 |
| WO | 9305970 A1 | 4/1993 |

* cited by examiner

ELECTRONIC CONTROLLED SUSPENSION APPARATUS AND VEHICLE HEIGHT CONTROL METHOD THEREOF

BACKGROUND OF THE INVENTION

1. Field of the Invention

The present invention relates to an electronic controlled suspension apparatus and a vehicle height control method thereof, and more particularly, to an electronic controlled suspension apparatus capable of stopping vehicle height control when a vehicle turns and performing the vehicle height control when the vehicle goes straight ahead by using vehicle height sensors instead of a steering angle sensor, and a vehicle height control method of the electronic controlled suspension apparatus.

2. Description of the Related Art

Generally, an electronic controlled air suspension apparatus is an apparatus for controlling the height of a vehicle using an air spring capable of controlling internal pressure of a suspension apparatus of the vehicle, instead of a conventional coil spring.

The operation of controlling a vehicle to be at a height that a driver desires using such an electronic controlled air suspension apparatus should be performed when the vehicle is in a driving state as well as in a stop state. However, since the distance between a vehicle body and a road wheel varies depending on a slope of a road surface and movement of the vehicle, the control of the vehicle height when the vehicle is in a driving state is very difficult as compared with the vehicle in a stop state.

Such an electronic controlled air suspension apparatus, which is mounted between the vehicle body and the road wheel, receives vehicle height signals from vehicle height sensors detecting actual height of the vehicle and filters the signals using a low pass filter, thereby removing inaccuracy of the vehicle height control occurring due to the slope of the road surface and the vibration of the vehicle body. However, the inaccuracy of the vehicle height control occurring due to the height difference between the left and right sides of the vehicle when the vehicle turns can be removed only when installing an additional sensor, such as a steering angle sensor or the like.

The steering angle sensor mounted to the steering wheel of a vehicle is a sensor that detects how much a driver intends to steer the vehicle, through which the intention of the driver to change the direction of the vehicle can be known before the movement of the vehicle begins to be changed.

Accordingly, even when air is injected in and discharged from an electronic controlled air suspension apparatus in which a steering angle sensor is employed, the vehicle height control is temporarily stopped before the movement of the vehicle begins to be changed, and is resumed after the vehicle terminates to turn, thereby removing the inaccuracy of the vehicle height control occurring due to the turn of the vehicle.

However, if a steering angle sensor is used only to remove the inaccuracy of the vehicle height control occurring when the vehicle turns, the manufacturing costs of the system is unnecessarily increased.

BRIEF SUMMARY OF THE INVENTION

According to one embodiment, an electronic controlled suspension apparatus and a vehicle height control method thereof is provided, wherein without using a steering angle sensor, the vehicle height control is stopped when a vehicle turns and resumed when the turning is terminated.

According to one embodiment, an electronic controlled suspension apparatus comprises a plurality of vehicle height sensors for measuring a height of a vehicle; a vehicle height adjusting actuator operated for adjusting the height of the vehicle; air springs controlled by the vehicle height adjusting actuator; and an electronic controlled unit (ECU) for calculating a height difference value between the left and right sides of the vehicle based on vehicle height signals received from the vehicle height sensors and determining whether to operate or stop the vehicle height adjusting actuator through the comparison of the calculated height difference value between the left and right sides of the vehicle with a predetermined reference value.

According to another embodiment, the apparatus further comprises a counter for counting time from a point when the vehicle begins to go straight ahead after a turning condition which is a condition that the height difference value between the left and right sides of the vehicle becomes larger than the predetermined reference value, wherein if the time counted in the counter exceeds a predetermined time period, the ECU operates the vehicle height adjusting actuator according to a control signal for adjusting vehicle height.

According to yet another embodiment, the apparatus further comprises a switch for selecting at least one vehicle height control reference value, wherein the ECU performs vehicle height control based on the vehicle height control reference value selected by the switch.

According to still another embodiment, the ECU comprises a signal receiving unit for receiving the vehicle height signals from the vehicle height sensors; a calculating unit for calculating the height difference value between the left and right sides of the vehicle according to the received vehicle height signals; a compare-and-determining unit for comparing the calculated height difference value between the left and right sides of the vehicle with the predetermined reference value and determining whether to stop or perform the vehicle height control; and a vehicle height adjusting unit for stopping operation of the vehicle height adjusting actuator by outputting a control signal for temporarily stopping the vehicle height control or operating the vehicle height adjusting actuator by outputting a control signal for performing vehicle height control according to the determination result of the compare-and-determining unit.

According to another embodiment of the present invention, a vehicle height control method of an electronic controlled suspension apparatus comprises the steps of receiving vehicle height signals from the vehicle height sensors; calculating a height difference value between the left and right sides of the vehicle according to the received vehicle height signals; and determining whether to operate or stop the vehicle height adjusting actuator through comparison of the calculated height difference value between the left and right sides of the vehicle with a predetermined reference value.

According to yet another embodiment, the method further comprises the steps of counting time from a point when the vehicle begins to go straight ahead after a turning condition which is a condition that the height difference value between the left and right sides of the vehicle becomes larger than the predetermined reference value; and operating the vehicle height adjusting actuator according to a control signal for adjusting vehicle height if the counted time exceeds a predetermined time period.

According to still another embodiment, the step of determining comprises the steps of determining whether to stop or perform the vehicle height control by comparing the calculated height difference value with the predetermined reference value; and stopping the operation of the vehicle height adjusting actuator by outputting a control signal for temporarily stopping the vehicle height control or operating the vehicle height adjusting actuator by outputting a control signal for performing the vehicle height control according to the determination result.

DETAILED DESCRIPTION OF THE INVENTION

Figure 1:
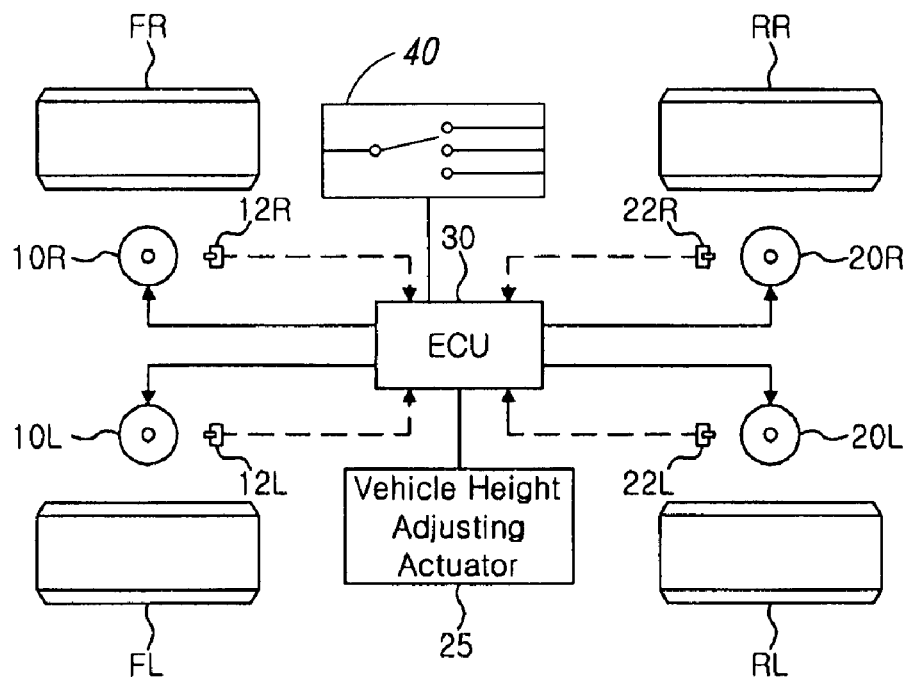
FIG. 1 is a view schematically showing an electronic controlled suspension apparatus according to an embodiment of the present invention.
Figure 2:
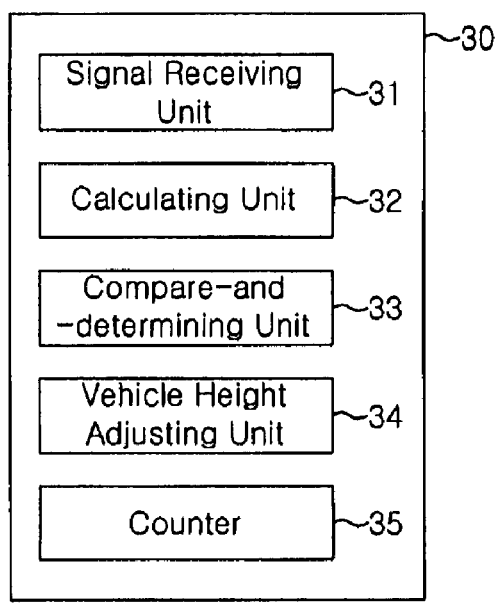
FIG. 2 is a block diagram illustrating an ECU shown in FIG. 1 in detail.

FIG. 1 is a view schematically showing an electronic controlled suspension apparatus according to an embodiment of the present invention, and FIG. 2 is a block diagram illustrating an ECU shown in FIG. 1 in detail.

As shown in FIG. 1, the electronic controlled suspension apparatus comprises a plurality of vehicle height sensors 12L, 12R, 22L and 22R for measuring height of a vehicle, a vehicle height adjusting actuator 25 operated for adjusting the height of the vehicle, air springs 10L, 10R, 20L and 20R controlled by the vehicle height adjusting actuator 25, and an electronic controlled unit (ECU) 30 for calculating the height difference value between the left and right sides of the vehicle based on vehicle height signals received from the plurality of vehicle height sensors 12L, 12R, 22L and 22R and determining whether to operate or stop the vehicle height adjusting actuator 25 through the comparison of the calculated height difference value between the left and right sides of the vehicle with a predetermined reference value.

According to one embodiment, the electronic controlled suspension apparatus further comprises a counter 35 (FIG. 2) for counting time from the point when the vehicle begins to go straight ahead after a turning condition which is a condition that the height difference value between the left and right sides of the vehicle becomes larger than the predetermined reference value.

If the time counted in the counter 35 exceeds a predetermined time period, the ECU 30 outputs a control signal for performing the vehicle height control to the vehicle height adjusting actuator 25 and then operates the actuator 25.

The vehicle height sensors comprises front road wheel sensors 12L and 12R installed near the front left and right road wheels FL and FR and rear road wheel sensors 22L and 22R installed near the rear left and right road wheels RL and RR.

In one embodiment, as the vehicle height sensors 12L, 12R, 22L and 22R, each of which is to detect a relative distance between the vehicle body and the vehicle axle (i.e., vehicle height), the most typical ones are employed, in which rotating two levers are respectively mounted to the vehicle body and the vehicle axle to estimate the distance by detecting relative angles of the two levers with respect to linear displacement.

In one embodiment, the vehicle height adjusting actuator 25 may be a solenoid valve, which performs the opening and closing operations according to the control signal applied from the ECU 30. The vehicle height adjusting actuator 25 can be positioned corresponding to each of the aforementioned vehicle height sensors 12L, 12R, 22L and 22R.

The amount of air in the air springs 10L, 10R, 20L and 20R is adjusted according to the opening and closing operations of the solenoid valve, and thus the vehicle height is controlled. Such air springs comprise the front left and right road wheel air springs 10L and 10R and the rear left and right road wheel air springs 20L and 20R.

The ECU 30 receives vehicle height signals at the positions of the respective road wheels from the vehicle height sensors 12L, 12R, 22L and 22R and substantially controls the height of the vehicle based thereon.

The ECU 30 controls the vehicle height adjusting actuator 25 based on the vehicle height signals obtained from the respective vehicle height sensors.

Such ECU 30 may operate a compressor (not shown) and a pneumatic circuit (not shown) including the compressor using a certain control value.

According to one embodiment of the present invention, the ECU 30 is configured such that the height difference value between the left and right sides of the vehicle calculated based on the vehicle height signals received from the plurality of vehicle height sensors 12L, 12R, 22L and 22R is compared with a predetermined reference value to determine whether to operate or stop the vehicle height adjusting actuator 25 thereby controlling the vehicle height. The configuration of the ECU 30 will be described with reference to FIG. 2 as follows.

Referring to FIG. 2, the ECU 30 according to one embodiment of the present invention stops the vehicle height control when the vehicle turns and performs the vehicle height control when the vehicle goes straight ahead, using not a steering angle sensor but the vehicle height sensors. The ECU comprises a signal receiving unit 31, a calculating unit 32, a compare-and-determining unit 33, and a vehicle height adjusting unit 34.

At this time, in addition to the control of the vehicle height of the suspension apparatus, the ECU can perform the general control of suspension apparatuses and shock absorbers, and furthermore, participate in controlling other systems of the vehicle (for example, a steering and/or brake system).

The receiving unit 31 receives vehicle height signals from the two vehicle height sensors 12L and 12R (FIG. 1) of the front road wheels FL and FR and the two vehicle height sensors 22L and 22R (FIG. 1) of the rear road wheels RL and RR.

The calculating unit 32 calculates the height difference value between the left and right sides of the vehicle based on the vehicle height signals received in the receiving unit 31.

The compare-and-determining unit 33 compares the height difference value between the left and right sides of the vehicle, which is calculated in the calculating unit 32, with a predetermined reference value, and then, determines whether to stop or perform the vehicle height control.

Here, the vehicle height control is determined to be stopped if the height difference value between the left and right sides of the vehicle is larger than the predetermined reference value, which corresponds to a case where the vehicle is turning.

In addition, the vehicle height control is determined to be performed if the height difference value between the left and right sides of the vehicle is smaller than the predetermined reference value, which corresponds to a case where the vehicle goes straight ahead.

If the compare-and-determining unit 33 determines the vehicle height control to be stopped, the vehicle height adjusting unit 34 outputs a control signal for stopping the operation of the vehicle height adjusting actuator 25 (FIG. 1) that is operated for adjusting the vehicle height.

In addition, if the compare-and-determining unit 33 determines the vehicle height control to be performed, the vehicle height adjusting unit 34 outputs a control signal for controlling the operation of the vehicle height adjusting actuator 25 (FIG. 1) that is operated for adjusting the vehicle height. Accordingly, the air springs 10L, 10R, 20L and 20R (FIG. 1) perform the vehicle height control by adjusting the amount of air in the air springs through the control of the vehicle height adjusting actuator 25 that is operated according to the control signals output from the vehicle height adjusting unit 34.

In addition, after the steering is recovered, i.e., if the time counted in the counter 35 counting time from the point when the vehicle goes straight ahead after turning exceeds a predetermined time period, the vehicle height adjusting unit 34 operates the vehicle height adjusting actuator 25 again according to a control signal for adjusting the vehicle height.

In this manner, without using a steering angle sensor, it is possible to remove the inaccuracy of vehicle height control. Furthermore, according to the vehicle height signals received from the vehicle height sensors, the vehicle height control can be stopped when the vehicle turns and resumed when it goes straight ahead.

A vehicle height control method of an electronic controlled suspension apparatus having such a configuration will be described below.

Figure 3:
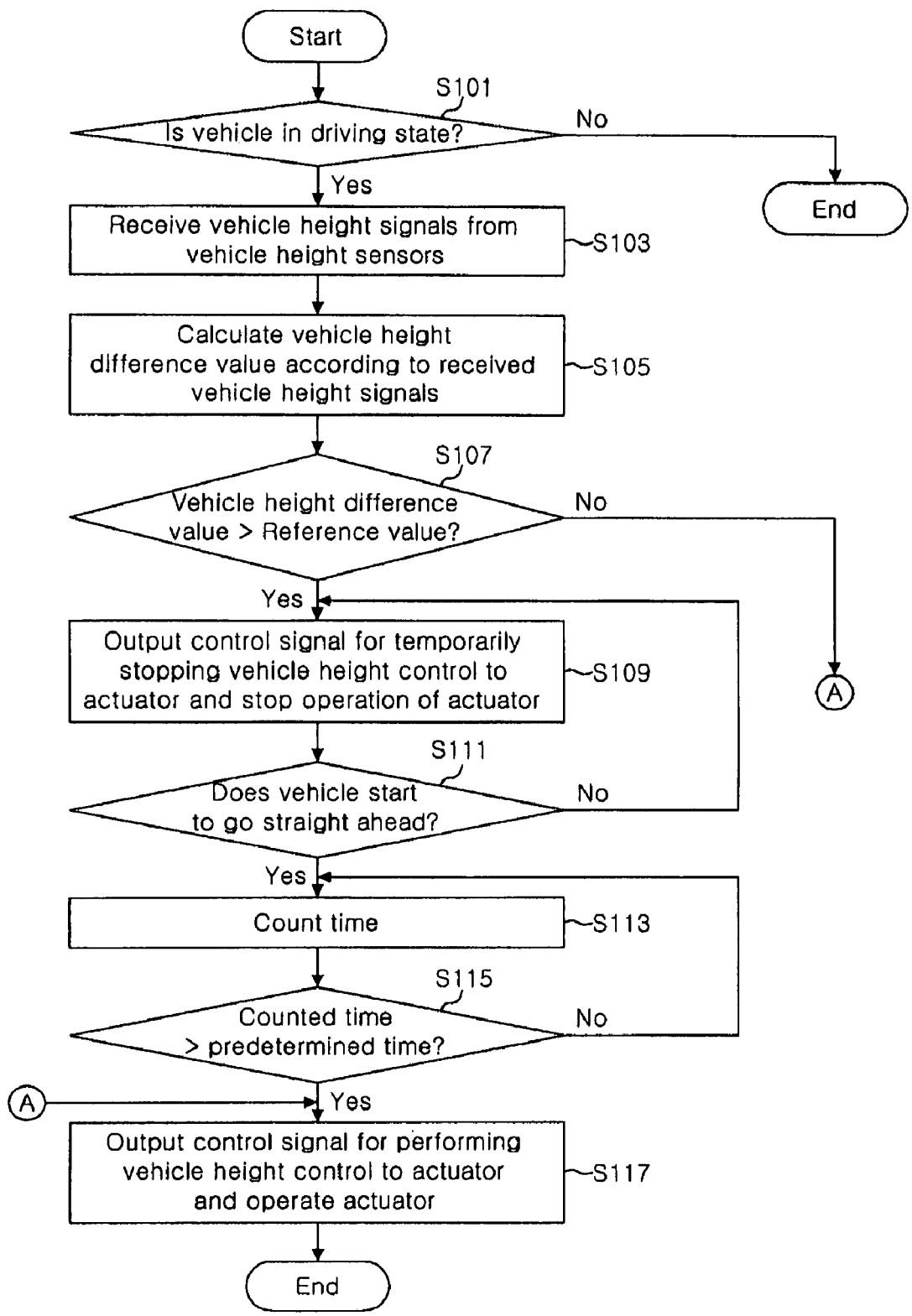
FIG. 3 is a flowchart illustrating a vehicle height control method of the electronic controlled suspension apparatus according to an embodiment of the present invention.

FIG. 3 is a flowchart illustrating a vehicle height control method of the electronic controlled suspension apparatus according to one embodiment of the present invention.

The ECU 30 determines whether a vehicle is in a driving state (step S101).

That is, the ECU determines whether the vehicle speed is larger than a predetermined speed (for example, 30 kph (18.6 mph)) according to the vehicle speed received from a vehicle speed sensor (not shown).

If as a result of the determination in step S101, the vehicle is not in a driving state, the ECU 30 terminates the process.

If as a result of the determination in step S101, the vehicle is in a driving state, the receiving unit 31 of the ECU 30 receives the vehicle height signals measured in the plurality of vehicle height sensors 12L, 12R, 22L and 22R installed to the vehicle (step S103).

Next, the calculating unit 32 of the ECU 30 calculates the height difference value between the left and right sides of the vehicle based on the vehicle height signals received from the plurality of vehicle height sensors 12L, 12R, 22L and 22R (step S105).

Then, the compare-and-determining unit 33 of the ECU 30 compares the calculated height difference value between the left and right sides of the vehicle with a predetermined reference value, and then, determines whether the height difference value between the left and right sides of the vehicle exceeds the reference value (step S107).

That is, if the height difference value exceeds the predetermined reference value, i.e., if the height difference between the left and right sides of the vehicle is large, the operation of the actuator is stopped, whereas if the height difference between the left and right sides of the vehicle is small, the actuator is operated. Accordingly, the vehicle height can be accurately controlled without a steering angle sensor.

If as a result of the determination in step S107, the height difference value does not exceed the predetermined reference value, the vehicle height adjusting unit 34 outputs a control signal for performing the vehicle height control to the vehicle height adjusting actuator 25 to operate the actuator 25 (step S117).

If as a result of the determination in step S107, the height difference value exceeds the predetermined reference value, the vehicle height adjusting unit 34 outputs a control signal for temporarily stopping the vehicle height control to the vehicle height adjusting actuator 25 to stop the operation of the actuator 25 (step S109).

Next, the vehicle height adjusting unit 34 determines whether the vehicle begins to go straight ahead after the operation of the actuator is stopped (step S11). That is, the vehicle height adjusting unit 34 determines whether the steering is recovered.

If as a result of the determination in step S11, the vehicle does not begin to go straight ahead, the vehicle height adjusting unit 34 causes the process to go to step S109 described above and the vehicle height control to be stopped.

If as a result of the determination in step S11, the vehicle begins to go straight ahead, the counter counts time from the point when the vehicle begins to go straight ahead (step S113).

Next, the vehicle height adjusting unit 34 determines whether the time counted in the counter 35 exceeds a predetermined time period (step S115).

If as a result of the determination in step S115, the counted time does not exceed a predetermined time period, the vehicle height adjusting unit 34 causes the process to go to step S115 to continue counting the time.

If as a result of the determination in step S115, the counted time exceeds a predetermined time period, the vehicle height adjusting unit 34 outputs a control signal for resuming the vehicle height control to the vehicle height adjusting actuator 25 and operates the actuator (step S117).

Accordingly, the vehicle height can be accurately controlled without a steering angle sensor.

Figure 4:
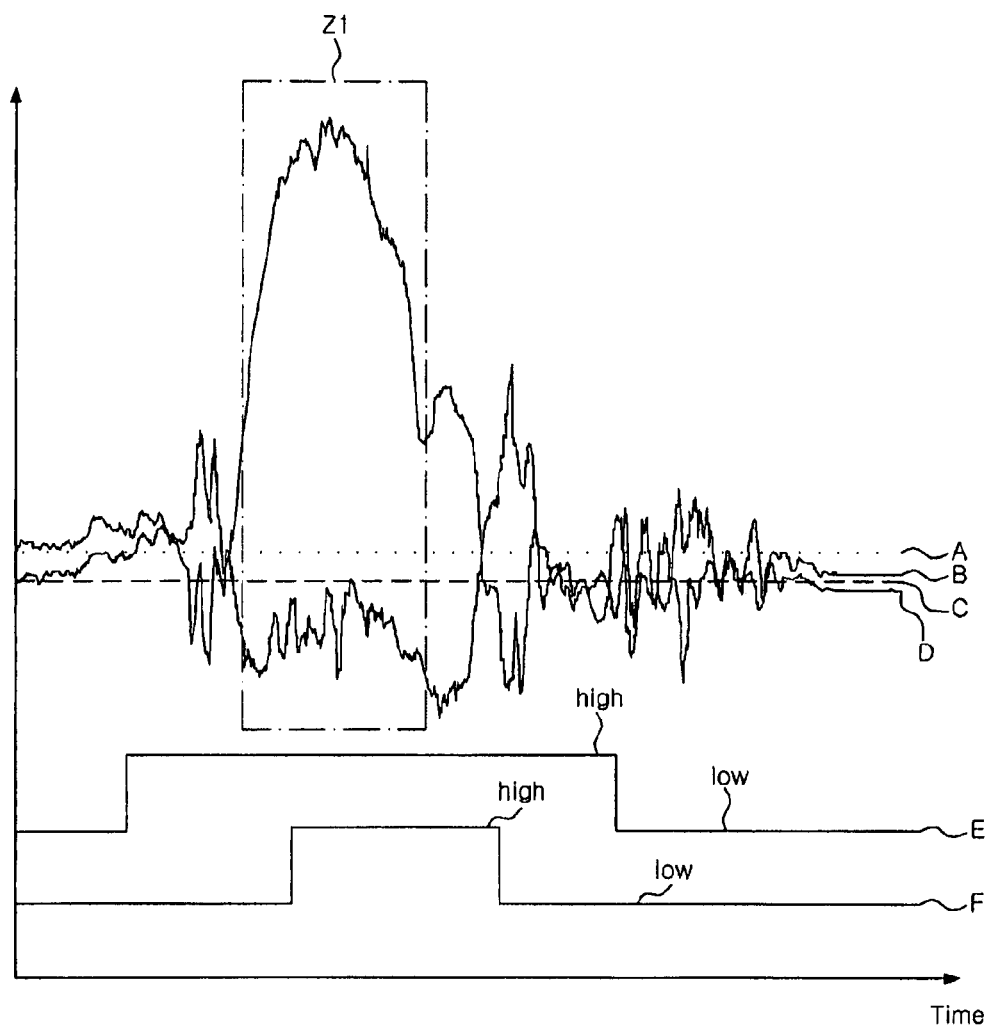
FIG. 4 is a graph illustrating a method of controlling vehicle height when a vehicle turns in a curved section according to an embodiment of the present invention.

FIG. 4 is a graph illustrating a method of controlling the vehicle height when a vehicle experiences a turn, for example a left turn, in a curved section according to one embodiment of the present invention.

Line A shows an average vehicle height signal before the vehicle height control, line B shows an average vehicle height signal after the vehicle height control, line C shows a vehicle height signal of the rear left road wheel, and line D shows a vehicle height signal of the rear right road wheel.

At section "Z1" in FIG. 4 showing a portion in which the vehicle height difference value is larger than the predetermined reference value, the vehicle height control is temporarily stopped.

As shown in the graph of FIG. 4, if the height difference value becomes larger than a predetermined reference value when the vehicle turns left and thus the height difference occurs between the rear left and right road wheels, the ECU 30 (FIG. 1) outputs a control signal for temporarily stopping the vehicle height control to the vehicle height adjusting actuator 25 (FIG. 1) to stop the operation of the actuator 25.

Thereafter, if the height difference value between the left and right sides of the vehicle becomes smaller than the reference value again, the time count is started. If the counted time exceeds a predetermined time period, it could be understood that the vehicle is not in a turning state. At this time, the vehicle height control is performed again.

Line E in FIG. 4 is a flag which shows whether the vehicle height control is performed or not. The flag is divided high state and low state. In the high state, the vehicle height control is performed and in the low state, the vehicle height control is stopped.

Line F in FIG. 4 is a flag which shows whether the vehicle is turning or not. The flag is divided high state and low state. In the high state, the vehicle is turning and in the low state, the vehicle goes straight ahead.

In the present embodiment, it has been described that using vehicle height sensors, the vehicle height control is stopped when a vehicle is turning and performed when the vehicle goes straight ahead. However, in another embodiment, there is provided a switch 40 (FIG. 1) for selecting at least one reference value for adjusting vehicle height, so that the vehicle height is controlled based on a corresponding vehicle height control reference value selected by the switch 40. In this case, the vehicle height control is also stopped when the vehicle turns. However, when the vehicle goes straight ahead, the vehicle height control is performed based on the vehicle height control reference value selected by the switch 40.

For example, such a vehicle height control reference value can be a reference value for controlling the vehicle height to be 'high', 'middle', or 'low', and can be selected as a desired vehicle height through user's operation of the switch 40. Accordingly, it is possible to perform the vehicle height control using a driver's desired reference value when a vehicle goes straight ahead.

According to the present invention described above, the vehicle height can be controlled without using a steering angle sensor, so that there is an effect of reducing manufacturing costs of the system.

Furthermore, according to the present invention described above, using the vehicle height sensors, the vehicle height control is stopped when a vehicle is turning and performed when the vehicle goes straight ahead, whereby it is effective that the vehicle height can be accurately controlled.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An electronic controlled suspension apparatus, comprising:
a plurality of vehicle height sensors configured to measure a height of a vehicle;
a vehicle height adjusting actuator configured to adjust the height of the vehicle;
air springs controlled by the vehicle height adjusting actuator; and
an electronic controlled unit configured to calculate a height difference value between the left and right sides of the vehicle based on vehicle height signals received from the vehicle height sensors and to determine whether the vehicle is turning, the electronic control unit stopping operation of the vehicle height adjusting actuator when the vehicle is turning if the calculated height difference value between the left and right sides of the vehicle exceeds a reference value, the electronic control unit operating the vehicle height adjusting actuator when the vehicle is not turning if the calculated height difference value between the left and right sides of the vehicle does not exceed the reference value.

2. The apparatus as claimed in claim 1, further comprising:
a counter configured to measure a duration from a time when the vehicle begins to travel straight after completing a turn, the electronic control unit operating the vehicle height adjusting actuator according to a control signal for adjusting vehicle height if the duration measured by the counter exceeds a threshold duration.

3. The apparatus as claimed in claim 1, further comprising a switch for selecting at least one vehicle height control reference value, wherein the electronic control unit performs vehicle height control based on the vehicle height control reference value selected by the switch.

4. The apparatus as claimed in claim 1, wherein the electronic control unit comprises:
a signal receiving unit configured to receive the vehicle height signals from the vehicle height sensors;
a calculating unit electrically coupled to the signal receiving unit and configured to calculate the height difference value between the left and right sides of the vehicle according to the received vehicle height signals;
a compare-and-determining unit electrically coupled to the calculating unit and configured to compare the calculated height difference value between the left and right sides of the vehicle with the reference value and determine whether the vehicle is turning or traveling straight according to whether the height difference value between the left and right sides of the vehicle exceeds or does not exceed the reference value, respectively; and
a vehicle height adjusting unit in electrical communication with the compare-and-determining unit, the vehicle height adjusting unit stopping operation of the vehicle height adjusting actuator by outputting a control signal to temporarily stop the vehicle height control when the compare-and-determining unit determines that the vehicle is turning, the vehicle height adjusting unit operating the vehicle height adjusting actuator by outputting a control signal to perform vehicle height control when the compare-and-determining unit determines that the vehicle is traveling straight.

5. A vehicle height control method of an electronic controlled suspension apparatus, which includes a plurality of vehicle height sensors for measuring height of a vehicle, a vehicle height adjusting actuator operated for adjusting the height of the vehicle, and air springs controlled by the vehicle height adjusting actuator, the method comprising the steps of:
receiving vehicle height signals from the vehicle height sensors;
calculating a height difference value between the left and right sides of the vehicle according to the received vehicle height signals; and
determining that the vehicle is turning if the calculated height difference value between the left and right sides of the vehicle exceeds a reference value;
determining that the vehicle travels straight if the calculated height difference value between the left and right sides of the vehicle does not exceed the reference value;
stopping operation of the vehicle height adjusting actuator when it is determined that the vehicle is turning; and
operating the vehicle height adjusting actuator when it is determined that the vehicle is traveling straight.

6. The method as claimed in claim 5, further comprising:
measuring a duration from a time when the vehicle begins to travel straight after completing a turn; and
operating the vehicle height adjusting actuator according to a control signal for adjusting vehicle height if the measured duration exceeds a threshold time period.

7. An electronic controlled suspension apparatus, comprising:
a plurality of vehicle height sensors configured to calculate a height of a vehicle;
a vehicle height adjusting actuator configured to adjust the height of the vehicle;
air springs controlled by the vehicle height adjusting actuator;
an electronic controlled unit configured to calculate a height difference value between the left and right sides of the vehicle based on vehicle height signals received from the vehicle height sensors and to determine whether to operate or stop the vehicle height adjusting actuator through a comparison of the calculated height difference value between the left and right sides of the vehicle with a reference value and based on a measured duration after a turn; and
a counter configured to measure a duration from when the vehicle begins to travel straight after a turning condition in which the height difference value between the left and right sides of the vehicle becomes larger than the reference value, the electronic control unit being configured to block operation of the vehicle height adjusting actuator until after the duration measured by the counter exceeds a selected duration.

8. A vehicle height control method of an electronic controlled suspension apparatus, which includes a plurality of vehicle height sensors for measuring height of a vehicle, a vehicle height adjusting actuator operated for adjusting the height of the vehicle, and air springs controlled by the vehicle height adjusting actuator, the method comprising the steps of:
receiving vehicle height signals from the vehicle height sensors;
calculating a height difference value between the left and right sides of the vehicle according to the received vehicle height signals;
determining whether to operate or stop the vehicle height adjusting actuator through comparison of the calculated height difference value between the left and right sides of the vehicle with a reference value; and
counting time from when the vehicle begins to travel straight after a turning condition in which the height difference value between the left and right sides of the vehicle becomes larger than the reference value; and
operating the vehicle height adjusting actuator according to a control signal for adjusting vehicle height after the counted time exceeds a threshold time period.

* * * * *